United States Patent
Fei et al.

(10) Patent No.: US 11,422,231 B2
(45) Date of Patent: Aug. 23, 2022

(54) METHOD FOR OPERATING A VEHICLE RADAR SYSTEM

(71) Applicant: Hella GmbH & Co. KGaA, Lippstadt (DE)

(72) Inventors: Tai Fei, Hamm (DE); Ridha Farhoud, Laatzen (DE); Tobias Breddermann, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 161 days.

(21) Appl. No.: 16/642,261

(22) PCT Filed: Aug. 10, 2018

(86) PCT No.: PCT/EP2018/071747
§ 371 (c)(1),
(2) Date: Feb. 26, 2020

(87) PCT Pub. No.: WO2019/042740
PCT Pub. Date: Mar. 7, 2019

(65) Prior Publication Data
US 2021/0072347 A1    Mar. 11, 2021

(30) Foreign Application Priority Data

Aug. 28, 2017 (DE) ................. 10 2017 119 624.2

(51) Int. Cl.
*G01S 7/35* (2006.01)
*G01S 13/536* (2006.01)
*G01S 13/931* (2020.01)

(52) U.S. Cl.
CPC ............ *G01S 7/354* (2013.01); *G01S 13/536* (2013.01); *G01S 13/931* (2013.01); *G01S 7/356* (2021.05)

(58) Field of Classification Search
CPC ........ G01S 7/354; G01S 7/356; G01S 13/532; G01S 13/584; G01S 13/64; G01S 13/536; G01S 13/343; G01S 13/345; G01S 13/931
(Continued)

(56) References Cited

U.S. PATENT DOCUMENTS 5,043,734 A * 8/1991 Niho .................... G01S 13/9011
                                                         342/197
5,117,238 A * 5/1992 Silverstein ............... H01Q 3/22
                                                         342/373
(Continued)

FOREIGN PATENT DOCUMENTS

DE          4128560 A1      3/1993
DE     102013210256 A1     12/2014

OTHER PUBLICATIONS

Hua, Yingbo, and Tapan K. Sarkar. "Matrix pencil method for estimating parameters of exponentially damped/undamped sinusoids in noise." IEEE Transactions on Acoustics, Speech, and Signal Processing 38.5 (1990): 814-824.

*Primary Examiner* — Erin F Heard
*Assistant Examiner* — Michael W Justice
(74) *Attorney, Agent, or Firm* — Husch Blackwell LLP

(57) ABSTRACT

A method is provided of operating a vehicle radar system in which at least one radar sensor is arranged for detecting targets in the surroundings of the vehicle. At least one two-dimensional spectrum is provided which is specific for detecting the at least one radar sensor. A main processing step is then performed for target separation in which modeling on the basis of the at least one provided two-dimensional spectrum is performed by means of parameter estimation such that the targets are detected.

9 Claims, 8 Drawing Sheets

(58) Field of Classification Search
USPC .................................................. 342/192, 196
See application file for complete search history.

(56) References Cited

U.S. PATENT DOCUMENTS

| | | | | |
|---|---|---|---|---|
| 5,168,214 | A * | 12/1992 | Engeler | G01R 23/165 455/132 |
| 5,872,628 | A * | 2/1999 | Erskine | G01S 17/58 356/4.09 |
| 6,924,762 | B2 * | 8/2005 | Miyake | G01S 13/931 342/146 |
| 7,068,216 | B2 * | 6/2006 | Kliewer | G01S 13/343 342/174 |
| 7,095,362 | B2 * | 8/2006 | Hoetzel | G01S 13/931 342/84 |
| 7,196,653 | B2 * | 3/2007 | Hall | G01S 13/9056 342/75 |
| 7,639,171 | B2 * | 12/2009 | Alland | H01Q 3/24 342/25 R |
| 8,081,105 | B2 * | 12/2011 | Tigrek | H04L 27/2607 342/204 |
| 8,102,309 | B2 * | 1/2012 | Nakagawa | G01S 13/931 342/147 |
| 8,169,362 | B2 * | 5/2012 | Cook | G01S 13/536 342/162 |
| 8,912,950 | B2 * | 12/2014 | Adcook | G01S 13/87 342/21 |
| 9,194,940 | B2 * | 11/2015 | Asanuma | G01S 13/42 |
| 9,952,314 | B2 * | 4/2018 | Lee | G01S 13/931 |
| 10,101,438 | B2 * | 10/2018 | Subburaj | G01S 7/292 |
| 10,330,773 | B2 * | 6/2019 | Rao | G01S 13/42 |
| 10,379,210 | B2 * | 8/2019 | Jansen | G01S 13/345 |
| 10,416,299 | B2 * | 9/2019 | Schoor | G01S 13/34 |
| 10,436,888 | B2 * | 10/2019 | Li | G01S 7/10 |
| 10,438,489 | B2 * | 10/2019 | Baba | G06K 9/629 |
| 10,502,824 | B2 * | 12/2019 | Roger | G01S 7/023 |
| 10,746,865 | B2 * | 8/2020 | Kageme | G01S 7/295 |
| 10,809,353 | B2 * | 10/2020 | Subburaj | G01S 7/292 |
| 2004/0252047 | A1 * | 12/2004 | Miyake | G01S 13/931 342/107 |
| 2005/0001761 | A1 * | 1/2005 | Kliewer | G01S 7/4021 342/174 |
| 2005/0104763 | A1 * | 5/2005 | Hall | G01S 13/9056 342/25 A |
| 2005/0156780 | A1 * | 7/2005 | Bonthron | G01S 3/48 342/134 |
| 2005/0225476 | A1 * | 10/2005 | Hoetzel | G01S 13/24 342/135 |
| 2005/0225481 | A1 * | 10/2005 | Bonthron | H01Q 21/0093 342/175 |
| 2008/0122680 | A1 * | 5/2008 | Morinaga | G01S 7/352 342/104 |
| 2009/0189800 | A1 * | 7/2009 | Benari | G01S 7/4052 342/134 |
| 2010/0134343 | A1 * | 6/2010 | Nakagawa | G01S 3/74 342/147 |
| 2011/0025546 | A1 * | 2/2011 | Cook | G01S 13/536 342/162 |
| 2011/0084872 | A1 * | 4/2011 | Kishida | G01S 13/931 342/146 |
| 2011/0102242 | A1 * | 5/2011 | Takeya | G01S 13/44 342/104 |
| 2011/0122013 | A1 * | 5/2011 | Takeya | G01S 13/584 342/109 |
| 2013/0030769 | A1 * | 1/2013 | Asanuma | G01S 7/354 702/189 |
| 2015/0168547 | A1 * | 6/2015 | Lee | G01S 13/931 342/104 |
| 2017/0023670 | A1 * | 1/2017 | Jansen | G01S 13/343 |
| 2017/0054449 | A1 | 2/2017 | Mani et al. | |
| 2017/0082744 | A1 * | 3/2017 | Matsumoto | G01S 7/352 |
| 2017/0102457 | A1 * | 4/2017 | Li | G01S 7/35 |
| 2017/0131394 | A1 * | 5/2017 | Roger | G01S 13/343 |
| 2017/0363711 | A1 * | 12/2017 | Rao | H04B 15/02 |
| 2018/0074168 | A1 * | 3/2018 | Subburaj | G01S 7/354 |
| 2018/0182243 | A1 * | 6/2018 | Baba | G08G 1/166 |
| 2018/0356495 | A1 * | 12/2018 | Moss | G01S 7/021 |
| 2019/0265346 | A1 * | 8/2019 | Hakobyan | G01S 13/347 |
| 2019/0339374 | A1 * | 11/2019 | Kageme | G01S 7/295 |
| 2020/0025871 | A1 * | 1/2020 | Subburaj | G01S 7/292 |
| 2021/0011118 | A1 * | 1/2021 | Subburaj | G01S 7/003 |

* cited by examiner

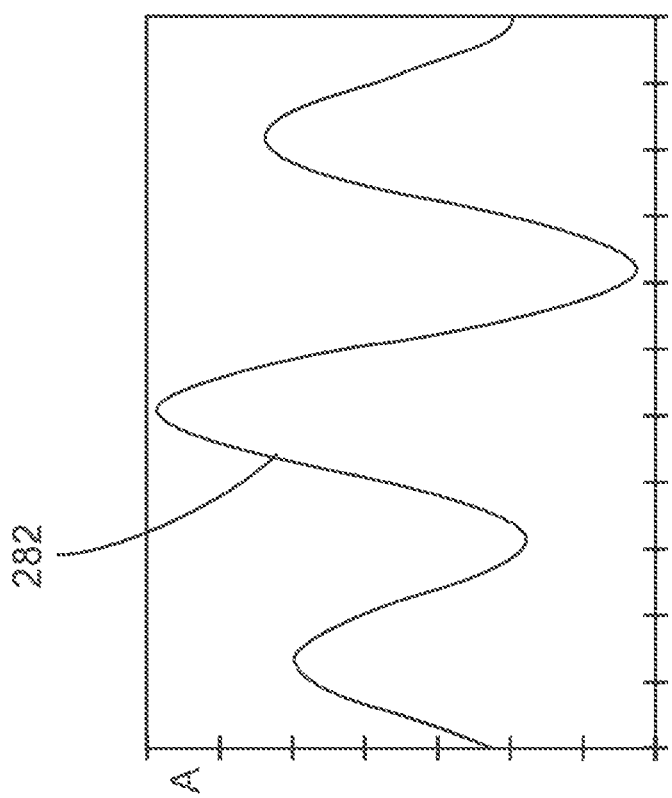
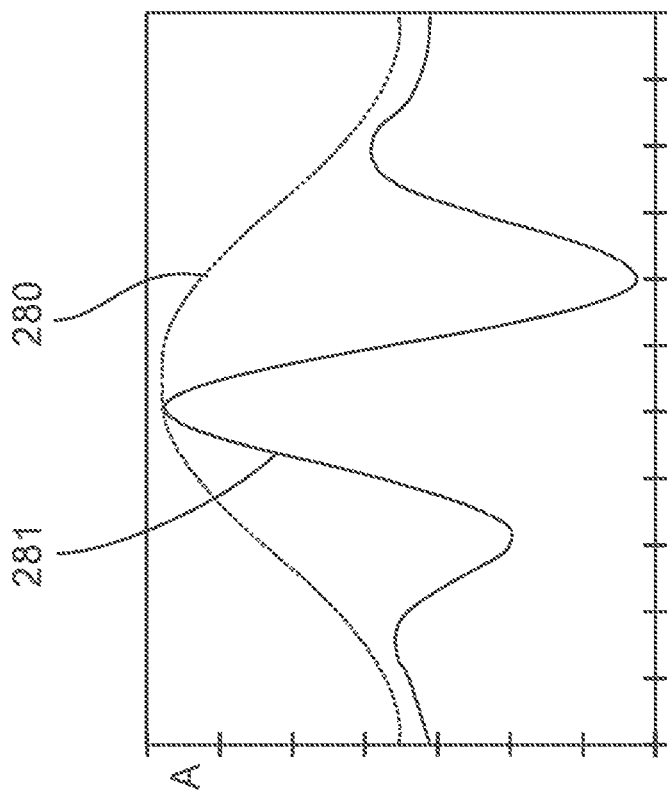
Fig. 8

METHOD FOR OPERATING A VEHICLE RADAR SYSTEM

CROSS REFERENCE

This application claims priority to PCT Application No. PCT/EP2018/071747, filed Aug. 10, 2018, which itself claims priority back to German Application No. 10 2017 119624.2, filed Aug. 28, 2017, the entirety of both of which are hereby incorporated by reference.

FIELD OF THE INVENTION

The present invention relates to a method of operating a radar system. Furthermore, the invention relates to a vehicle radar system and a computer program product for operating a radar system.

BACKGROUND

It is common knowledge to use in vehicles radar sensors that utilize frequencies such as 24 GHz or 77 GHz in order to determine the target parameters of detected targets, i.e. objects in the surroundings of the vehicle, by means of ramps following each other in quick succession ("fast chirps"). The target parameters are, for examples, the relative speed (between object and vehicle) and/or the distance (between object and vehicle) and/or the azimuth angle and/or the elevation angle of the object. The target list can subsequently be passed on to a target tracking method.

Radar sensors are of particular importance for current automotive applications, such as intersection assistants, autonomous emergency braking systems, rear traffic alert devices and the like. These require reliable target detection and subsequent precise target parameterization. The point targets, whose parameters are very similar with regard to system resolutions, often fall into one resolution cell during measurement and become overlapped. The measured values of individual target parameters are consequently falsified. It is therefore of great importance to separate such point targets prior to further processing.

Known solutions for target separation are, however, often technically complex or unreliable. Consequently, one challenge is posed by target separation while placing a limit on the computing power and resources required (such as memory).

SUMMARY OF THE INVENTION

Consequently one purpose of the present invention is to at least partially remedy the aforementioned disadvantages. In particular, the purpose of the present invention is to provide an improved possibility for target separation in a radar system.

The described features and details herein that refer to the inventive method also apply to the inventive radar system and the inventive computer program product, and vice versa in each case. This ensures that any disclosed information regarding individual aspects of the invention may be understood as reciprocally referring to each other.

The task is solved especially by means of a method of operating a vehicle radar system in which at least one radar sensor is provided for the purpose of detecting targets in the surroundings of the vehicle.

In doing so, it is intended in particular that the following steps are performed, where the steps can be preferentially performed consecutively or in any sequence and individual steps can also be performed repeatedly:

Provision of at least one two-dimensional spectrum which is specific for detecting the at least one radar sensor, Performance of a main processing step for target separation, in which modeling on the basis of the at least one provided two-dimensional spectrum is performed (especially by means of parameter estimation) such that the targets are detected.

This has the advantage of making it possible to reliably detect difficult to resolve targets. In this context, target separation is understood to constitute the separation of overlapping targets that are located physically too close to each other in the surroundings of the radar sensor.

The useful signals of the radar system can potentially feature two base frequencies (for example $f_1$ and $f_2$) (for example, with f1=50 kHz and/or f2=800 Hz as the frequencies caused by the distance and speed of the object) and the two frequencies can preferably be taken into consideration independently. This means that the two dimensions in the two-dimensional spectrum, especially the 2D distance-speed spectrum, are separable. In one dimension, it may in some cases be possible to show the useful signals as the sum of one-dimensional harmonic oscillation and thus of signals that can be modeled by complex exponential functions, $$y_{1D}(t) = x_{1D}(t) + n_{1D}(t) \quad (1)$$

$$= \sum_{i=1}^{M} R_i e^{s_i t} + n_{1D}(t),\ 0 \le t \le T,$$

where
$y_{1D}(t)$: observed time signal or alternatively measurement is
$n_{1D}(t)$: the noise.
$x_{1D}(t)$: the time signal without noise.
$R_i$: the complex amplitude, $$s_i := -\alpha_i + j\omega_i,\ \text{where} \quad (2)$$

$\alpha_i$: the damping and
$\omega_i$: the angle frequency.

After scanning, the signals can be digitalized, $$y_{1D}(kT_s) = x_{1D}(kT_s) + n_{1D}(kT_s) \quad (3)$$

$$= \sum_{i=1}^{M} R_i z_i^k + n_{1D}(kT_s),\ k = 0,\ \ldots,\ N-1,\ \text{and}$$

$$z_i = e^{s_i T_s},\ i = 1, 2, \ldots, M. \quad (4)$$

It is also possible to model the useful signals directly with the 2D spectrum model. In digitalized form, the model is then, for example, like $$y_{2D}(k_1 T_{s_1}, k_2 T_{s_2}) = x_{2D}(k_1 T_{s_1}, k_2 T_{s_2}) + \quad (5)$$
$$n_{2D}(k_1 T_{s_1}, k_2 T_{s_2})$$
$$= \sum_{i=1}^{M} R_i z_{1,i}^{k_1} z_{2,i}^{k_2} + n_{2D}(nT_{s_1}, lT_{s_2}),$$

$$k_1 = 0,\ \ldots,\ K_1 - 1$$
$$k_2 = 0,\ \ldots,\ K_2 - 1$$

where $z_{1,i}=e^{s_{1,i}T_{s1}}$, $z_{2,i}=e^{s_{2,i}T_{s2}}$, and $s_{1,i}=-\alpha_1+j\omega_{1,i}$, $s_{2,i}=-\alpha_2+j\omega_{2,i}$. $s_{1,i}$ or $s_{2,i}$ designate the complex frequencies in first or second dimension of 2D spectrum (two-dimensional spectrum of the radar sensor), and correspondingly $T_{s1}$ and $T_{s2}$ are the times in both dimensions. As the window function is normally known in an FFT (fast Fourier transform), the model of the spike of an individual point target is also known according to the Fourier transform. The unknowns in such models in particular only consist of the complex amplitudes and the frequency of the harmonic oscillation in the time range or the contribution, the phase and the position of the spike in the frequency range. Consequently, the problem can be solved either in the time range or the frequency range. If noise is present, the precision of the solution depends on the signal-noise ratio.

It is especially preferable for the problem to be solved in the time range without the influence of window functions, as the mathematical form of the window function is generally very complex. Furthermore, the 2D problem can be broken down into two one-dimensional problems. This means that the target separation can take place either in the first dimension or the second dimension, where modeling in Gl. 3 and Gl. 4 is preferentially used. Depending on the system setting, the separation abilities can be different in first and second dimensions. For example, in the 24 GHz system the bandwidth is frequently limited. For this reason, the resolution in the first dimension (distance) can be relatively more coarse in comparison to the resolution in the second dimension (speed). In this case, the separation can be performed in the second dimension, which constitutes an advantage. Furthermore, the separation in both dimension can, under certain circumstances, be comprehensively treated at the same time as modeling in Gl. 5.

It is possible that preprocessing, such as subsampling, will reduce the quantity of data before it is processed in the main processing step.

Preferably, target separation can be performed by the main processing step, which facilitates detection of the targets. Subject to certain assumptions, e.g. that there is a total of no more than$^M$ independent point targets in the overlap, the number of unknowns in the parameter estimation model are determined. If the number of (subsampled) values is the same or larger than the number of unknowns, this problem relating to parameter estimation is solvable. Known approaches include, for example, "matrix pencil methods" for solving mathematical problems of this kind. As examples, algorithms for using the matrix pencil method for solving the problem pursuant to the 1D model in Gl. 3 or the 2D model in Gl. 5 are disclosed in "Y. HUA, and T. K. SARKAR, Matrix Pencil Method for Estimating Parameters of Exponentially Damped/Undamped Sinusoids in Noise, IEEE Trans. on Acoustics, Speech, and Signal Processing, vol. 38, No. 5, pp. 814-824, May, 1990".

Furthermore, it is conceivable that the complex amplitudes $R_i$ and the frequencies $\omega_i$ (or $\omega_{1,i}$ and $\omega_{2,i}$) are received as solutions. These frequencies that are contained here by means of parameter estimation are located in the baseband. In order to correctly obtain the distances and speeds (for target separation), frequency shifts $\Delta f_1$ and $\Delta f_2$ that may be performed in a preprocessing step must also be taken into account. The complex amplitudes contain the information on the performances and the phases of the targets, i.e. potentially of previously overlapping targets. Furthermore, differential phases between the (for example, three) receiving antennas can be used instead of the frequency tuple to determine the run time difference of the reflected signal and thus the azimuth angle. In other words, the targets can be separated and identified on the basis of the output of modeling in the main processing step.

According to a refinement of the invention, which constitutes an advantage, one option is for the following step to be performed prior to performance of the main processing step:

Performance of a preprocessing step on the at least one provided spectrum, preferentially at a minimum for data compression, which determines a processing signal causing the modeling as part of the main processing step to be preprocessed performed on the basis of the processing signal.

In this context, data compression facilitates faster and more efficient processing of the spectrum in the subsequent main processing step. An advantage stems from treating the resulting output of the (entire) preprocessing step as the processing signal, where the preprocessing step can correspondingly feature several substeps. This facilitates comprehensive adaptation of the spectrum to determine the processing signal in order to be able to efficiently perform the main processing step.

Furthermore, one additional option is for the performance of the preprocessing step to further comprise the following (sub)step:

Performance of separation between useful information and noise in the spectrum provided or partially preprocessed (by means of any preprocessing performed beforehand), preferentially by means of a threshold value method, preferably a CFAR threshold value method.

This provides the advantage that noisy components of useful information can be separated by a simple method that can be executed quickly.

One possible option is for the input signal of the processing chain of the inventive method is a two-dimensional spectrum (2D spectrum), in which only a small part of the overall surface is filled with useful signals. The other surfaces then potentially only contain noise. A threshold method based on a CFAR (constant false alarm rate) can be used for this in order to distinguish the useful signal from the noise. The distribution density function of the noise can be estimated, for example, on the basis of the entire spectrum in one cycle or the scanning of the spectra over several cycles. Depending on the permissible error rate for the false alarm, the threshold for the useful signal is then determined by separating the inverse distribution function from the noise. In order to reduce the effort involved in signal processing, in certain cases only the local maximums or the spikes can be taken into consideration.

One additional option within the scope of the invention is for performance of the preprocessing step to further comprise the following (sub)step:

Shift of at least one relevant frequency band in the provided or partially preprocessed spectrum into a lower frequency range, preferentially a baseband of the radar sensor, where the relevant frequency band comprises overlapping targets.

This allows the processing speed to be significantly increased.

Furthermore, one option is for the performance of the preprocessing step to further comprise the following (sub) step:

Transformation back of the provided or partially preprocessed spectrum into the time range in order to specify the processing signal as a time signal causing target separation to be performed on the basis of the modeling in the time range.

In this context, processing in the time range can be performed significantly more quickly than is possible in the alternative frequency range, which constitutes an advantage. According to Gl. 3 or Gl. 5, the overlapping of the point targets is modeled in the time range. 1D inverse finite Fourier transform (IFFT) or 2D IFFT allows the the provided or partially preprocessed spectrum to be transformed into the time range. The output in the time range can be formulated as presented in the following $$\tilde{x}_{1D}(kT_s) = x_{1D}(kT_s) \times w_{1D}(kT_s), \quad (6)$$

where $w_{1D}(kT_s)$ is a 1D window function, or $$\tilde{x}_{2D}(k_1 T_{s_1}, k_2 T_{s_2}) = x_{2D}(k_1 T_{s_1}, k_2 T_{s_2}) \times w_{2D}(k_1 T_{s_1}, k_2 T_{s_2}), \quad (7)$$

where $w_{2D}(kT_s)$ is a 2D window function.

One additional advantage can be achieved within the scope of the invention if the preprocessing step further comprises the following (sub)step:

performance of compensation of a window function relating to the provided or partially preprocessed spectrum.

In this way, target separation can be performed with improved accuracy by decoupling the window function from the signal $\tilde{x}_{1D}$ or $\tilde{x}_{2D}$. This means that the processing time signals $x_{1D}$ or $x_{2D}$ can correspond to the model in Gl. 3 or Gl. 5. As the window function used ($w_{1D}$ or $w_{2D}$) is usually known, the procedure for decoupling the window function can be preferably implemented by division. In particular, the output consists of estimates of the real time signals ($x_{1D}$ or $x_{2D}$), and the estimates are designated as $\tilde{x}_{1D}$ or $\tilde{x}_{2D}$.

In addition, it is conceivable within the scope of the invention is for performance of the preprocessing step to further comprise the following (sub)step:

performance of subsampling for data compression relating to the provided or partially preprocessed spectrum.

The frequency bands relevant in the step consisting of the shift (of at least one relevant frequency band in accordance with the preprocessing step) can be narrow bands, and they can be moved into a lower frequency range by the preprocessing step. Consequently, a complete representation of the signals to be processed may not require the entire bandwidth of the original spectrum. For this reason, subsampling of the time signals $\tilde{x}_{1D}$ or $\tilde{x}_{2D}$ may be expedient. For example, the bandwidth amounts to 4 frequency bins in the spectrum. If the time signal is complex, only 4 frequency bins are theoretically required. This means that, in the example, the 64 scanning values can be reduced to 4 scanning values by means of subsampling. In order to be able to tolerate the noise in the modeling, 8 rather than 4 subsampling values are preferably taken in this case for practical reasons. As the boundary values in the window function are always very small, the values at the boundary of the estimates $\tilde{x}_{1D}$ or $\tilde{x}_{2D}$ are liable to being noisy. During the subsampling of $\tilde{x}_{1D}$ or $\tilde{x}_{2D}$, it is consequently especially preferable not to record the boundary values. The subsampled values from $\tilde{x}_{1D}$ or $\tilde{x}_{2D}$ can be understood to be the measurement in the model pursuant to Gl. 3 or Gl. 5.

According to a further advantage, one option is for the following step to be performed subsequent to performance of the main processing step:

Performance of a postprocessing step during which a plausibility check of modeling output of the parameter estimation is carried out in order to perform target separation depending on the plausibility check.

This makes it possible to ensure the correctness of the output of the main processing step.

In a further option, it is possible for the modeling to be effected in accordance with the main processing step in two dimensions or alternatively only in one dimension. The use of two dimensions can potentially lead to improved modeling output, whereas modeling in only one dimension increases the speed.

Another object of the invention is a radar system for a vehicle that is operated in accordance with an advantage of the system at 24 GHz and/or 77 GHz, featuring:

a radar sensor for detecting a detection signal (such as the emission of at least one signal and/or the reception of reflected signals, preferentially with a frequency in the range around 24 GHz and/or 77 GHz for the purpose of detecting targets in the surroundings of the vehicle, a processing device for processing the detection signal by means of an inventive method.

As a result, the inventive radar system brings about the same advantages as were described in detail in relation to an inventive method.

A further advantage may arise from the invention if the vehicle takes the form of a motor vehicle, specifically a passenger or goods vehicle and/or an electric vehicle or hybrid vehicle.

The processing device takes the form, for example, of a signal processor, where a two-dimensional spectrum of the radar sensor preferentially forms the input signal for the processing device for performing an inventive method. In particular, the use in this context of the inventive method during operation of the processing device offers significant speed and performance advantages, even if simple (embedded) hardware is used.

Another object of the invention is a computer program product that can be executed by a processing device such as a processor or microcontroller or the like, where execution of the inventive computer program product brings about performance of the following steps by the processing device:

Provision of at least one two-dimensional spectrum, which is specific for detection of targets of at least one radar sensor, Performance of a main processing step for target separation, in which modeling on the basis of the at least one provided two-dimensional spectrum is performed by means of parameter estimation in order to preferentially perform detection of the targets.

As a result, the inventive computer program product brings about the same advantages as were described in detail in relation to an inventive method and/or radar system. It is additionally advantageous if the computer program product is designed in such a way as to perform an inventive method and/or operate an inventive radar system.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 8 is a visualization of a window function compensation.

DETAILED DESCRIPTION OF THE DRAWINGS

Figure 1:
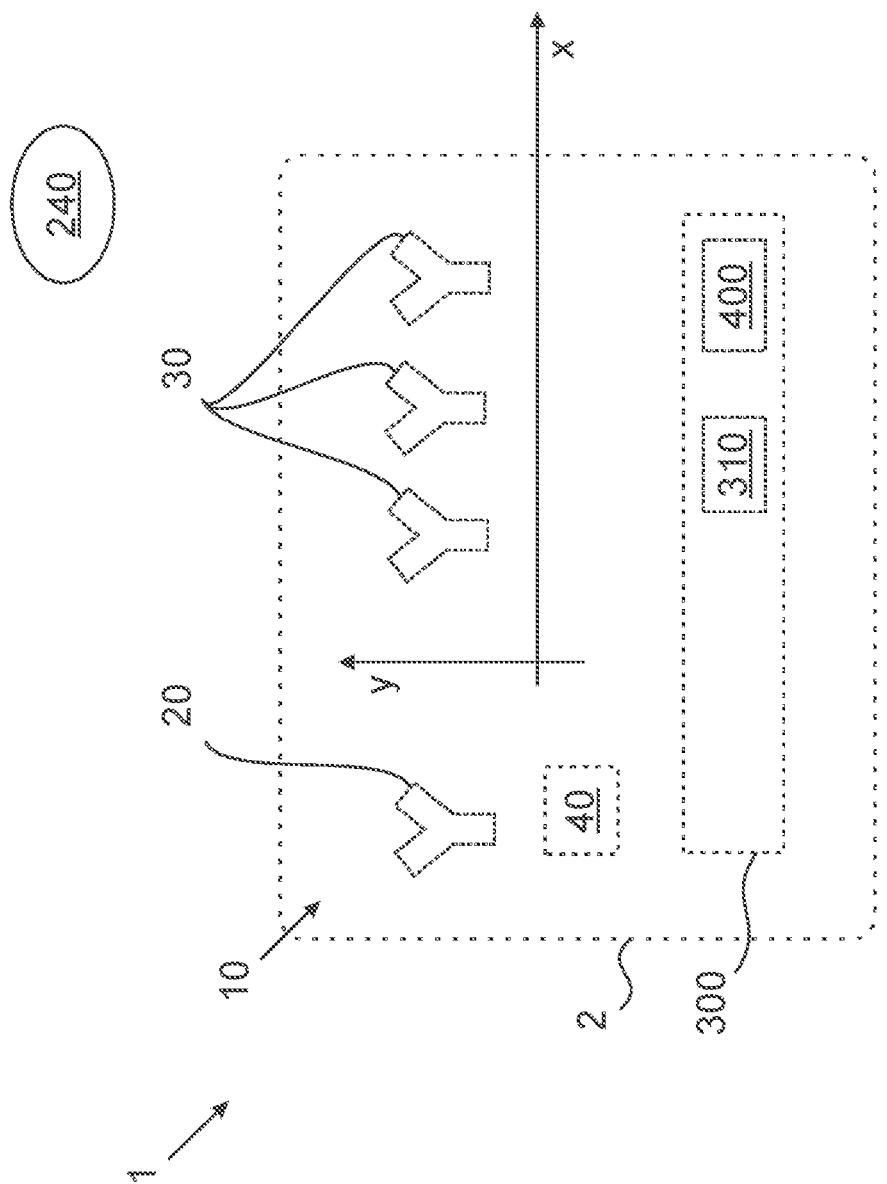
FIG. 1 is a block circuit diagram of a radar sensor of an inventive radar system.

An inventive radar system 1, as schematically depicted in FIG. 1, can comprise at least one radar sensor 10. In this context, the radar sensor 10 can be fastened to a vehicle 2, for example in the area of the radiator grill and/or in the side area in order to detect targets 240 in the surroundings of the vehicle 2, for example in the direction of travel and/or in a side area of the vehicle 2. The radar sensor 10 preferably comprises a transmission antenna 20 and at least three receiving antennas 30. In this context, the receiving antennas 30 may be arranged equidistantly in x orientation. Furthermore, the transmission antennas 20 can feature both a certain distance in the x orientation and a certain distance in the y orientation to each other and operate in time multiplex (alternating, time-delayed transmission of the same signal). The x and y orientations are each visualized schematically by arrows. Furthermore, a processing device 300 of the radar sensor 10, such as a processor or the like, is shown that can feature an analog to digital converter 310 and/or a computer program product 400. A further option for operation of the radar sensor 10, for example, the transmission antenna 20 is a digital-to-analog converter 40.

Figure 2:
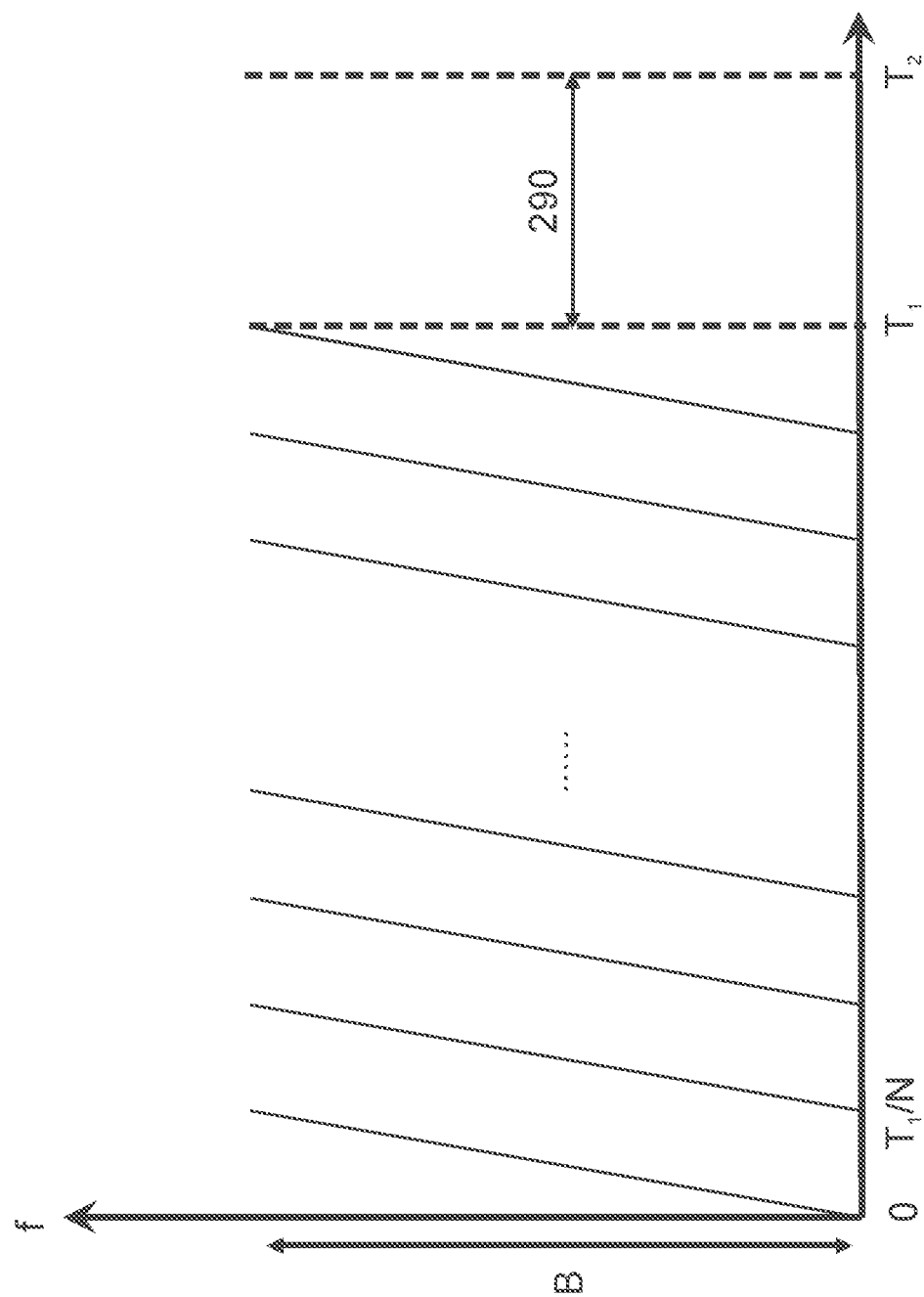
FIG. 2 is a transmission scheme with an inventive radar system.

One option is for the radar sensor 10 to use a rapid succession of ramps as transmission scheme for determining target parameters with regard to the targets 240. In doing so, within one cycle of duration $T_1$ N frequency ramps of duration $T_1/N$ can be transmitted consecutively (see FIG. 2). The current transmission frequency f of the frequency ramps may in this context be altered linearly within the transmission bandwidth B (linear frequency modulation). The processing 290 of the data received within time $T_1$ can be subsequently carried out in time period $T_2-T_1$ so that the entire measuring cycle corresponds to a duration of $T_2$. As an example, the processing 290 in this context comprises at least the steps of an inventive method 100, so that a processing device 300 is being operated for processing 290 at least in this time period $T_2-T_1$.

Figure 3:
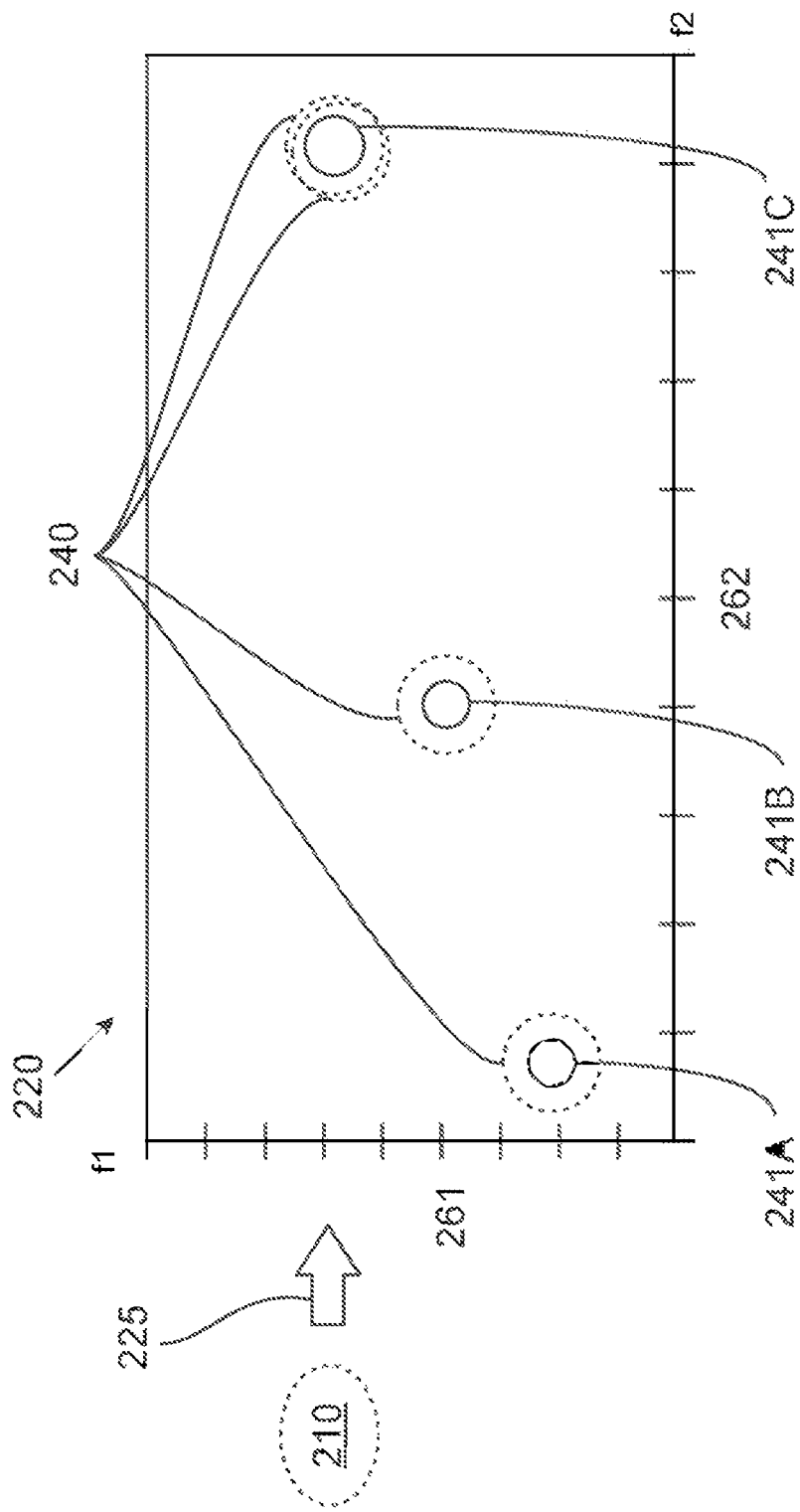
FIG. 3 is an example of a two-dimensional spectrum (2D distance-Doppler spectrum).

The reflected signal in the receivers is initially mixed with the transmission signal down the base band and scanned and is at time point $T_1$ stored in a M×N matrix (M scan values per ramp, N ramps). This means that the data of this matrix can be regarded as detection signal 210 of the radar sensor 10. Subsequently, transformation 225 of the 2D base band signal (detection signal 210) stored in such a way can be performed in the 2D frequency range in order to make the two-dimensional spectrum 220 available. The relevant point targets (detected targets 240 in the surroundings) are displayed in the 2D spectrum 220 as spikes 241A, 241B, 241C (see FIG. 3). In this context, the spikes in the digram of the two-dimensional spectrum 220 are shown with a vertical orientation 261 of the spectrum 220 in accordance with a first dimension and with a horizontal orientation 262 of the spectrum 220 in accordance with a second dimension. It is an advantage for the spectrum 220 to be designed as a 2D distance-Doppler spectrum, so that the vertical orientation 261 (f1) is dependent on the distance to a target 240 and the horizontal orientation 262 (f2) is dependent on a relative speed to the target 240.

It is possible for the spectrum 220 to feature fewer spikes 241A, 241B, 241C than there are actual targets 240 (point targets). This makes it possible for only 3 spikes in the spectrum to be visible, for example the spikes 241A, 241B and 241C, despite the existence, for example, of 4 point targets 240. The spike 241C expands further than the two other peaks 241A, 241B, and two point targets 240 overlap each other at this position. In accordance with conventional detection methods (for example, a local maximum principle), this therefore results in a signal consisting of 2 base frequencies $f_1$ (first dimension) and $f_2$ (second dimension) for one spike. The frequency $f_1$ may under certain circumstances be exclusively dependent on the distance R of the target and the frequency $f_2$ in particular exclusively dependent on the relative speed v. The accuracy of the frequencies $f_1$ and $f_2$ can also be improved, for example, by interpolation with adjacent points. Furthermore, differential phases between the 3 receiving antennas 30 can be used instead of the frequency tuple to determine the run time difference of the reflected signal and thus the azimuth angle. The raw target parameters determined in this way form (potentially together with additional information such as the signal level and reliability of the values generated) what is referred to as a raw target from which objects can potentially be formed in a further processing step using tracking algorithms. The frequencies $f_1$ and $f_2$ resulting from spike 241C are, however, falsified on account of the overlapping of two point targets 240.

Figure 4:
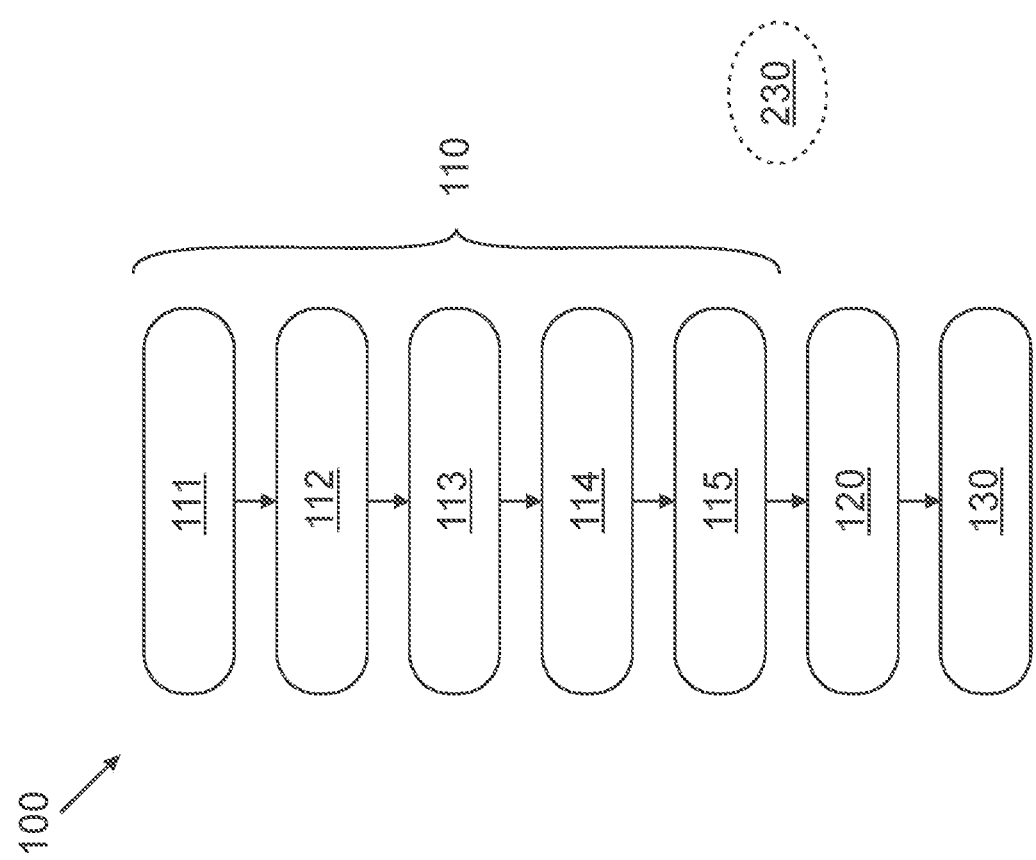
FIG. 4 is an exemplary sequence of an inventive method.

FIG. 4 schematically visualizes an inventive method 100. It shows that the method can be broken down into a preprocessing step 110, a main processing step 120 and a postprocessing step 130. In accordance with the preprocessing step 110, it is possible for a first step 111 to be performed, specifically the search for local maximums or spikes (e.g. by means for a threshold value method for separating useful information and noise. Furthermore, according to a second step 112, selection of potential overlaps can be performed. In a third step 113, it is possible to perform a shift of a relevant frequency band and/or an inverse (fast) Fourier transform in order to transfer the spectrum 220 into the time range. In a fourth step 114, it is subsequently possible to compensate a window function and in a fifth step 115 to perform downsampling in order to maintain the processing signal 230. In this context, it is possible to select a different sequence of steps or to dispense with individual steps or potentially introduce further steps. As part of the main processing step 120, the parameter estimation is performed on the basis of the processing signal 230 and, optionally the plausibility check as part of the postprocessing step 130.

Figure 5:
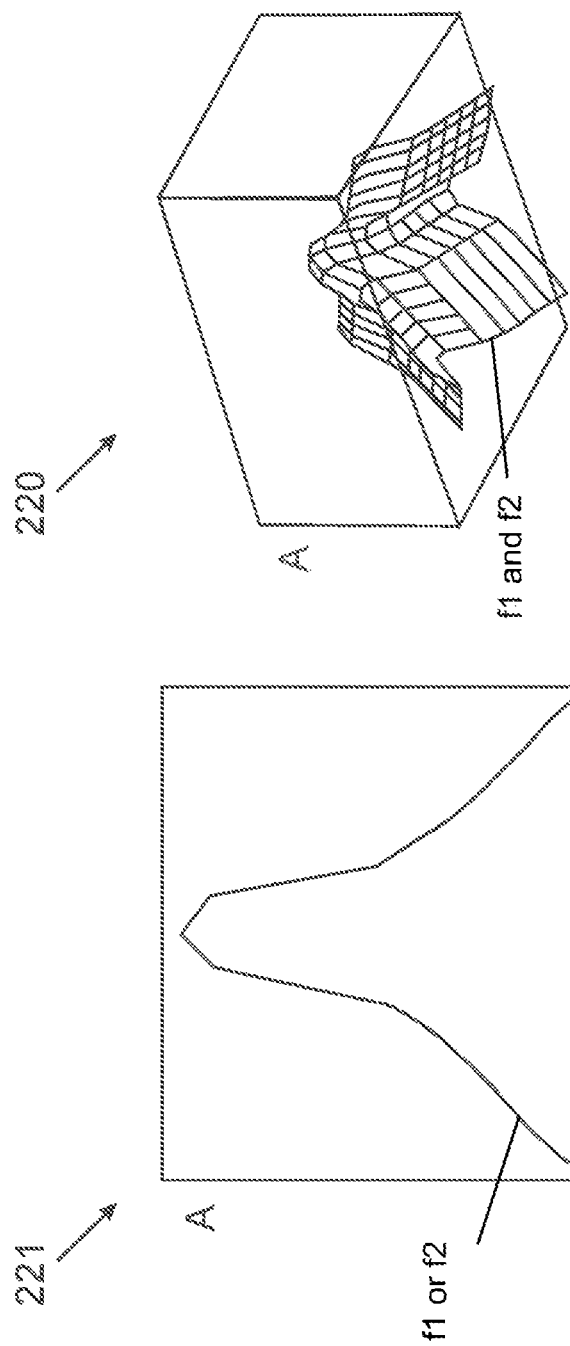
FIG. 5 is a visualization of a spike pattern spectrum.

It is possible for only the local maximums or spikes to be taken into account in the spectrum 220 according to the second step 112 in order to reduce the effort needed for signal processing. This is depicted in more detail below on the basis of FIG. 5. In this respect, a one-dimensional spike pattern spectrum 221 and a two-dimensional spike pattern spectrum 220 are schematically depicted (with amplitude A and frequencies f1 and f2; as an alternative, the one-dimensional spectrum 221 may optionally be frequency f1 or f2). It is possible for most of the spikes identified in the spectra to be treated as point targets. Selection of the potential overlaps in the 2D spectra can, for example, be implemented by means of a cross correlation. If the separation task is handled in 1D, the 1D spike in the spectrum to be examined can be folded with a 1D spike pattern (or alternatively the 1D FFT output of the window function) either in the first or the second dimension. Such folding is, for example, normed on the spike to be examined. It is subsequently possible to perform a comparison to a predefined threshold value. If the cross correlation is smaller than the threshold value, it is very likely that the spike examined constitutes an overlap of several point targets. If the problem is to be treated in accordance with with model in Gl. 5, the cross correlation should be folded here with a 2D spike pattern (or the 2D FFT output of the window function.

Figure 6:
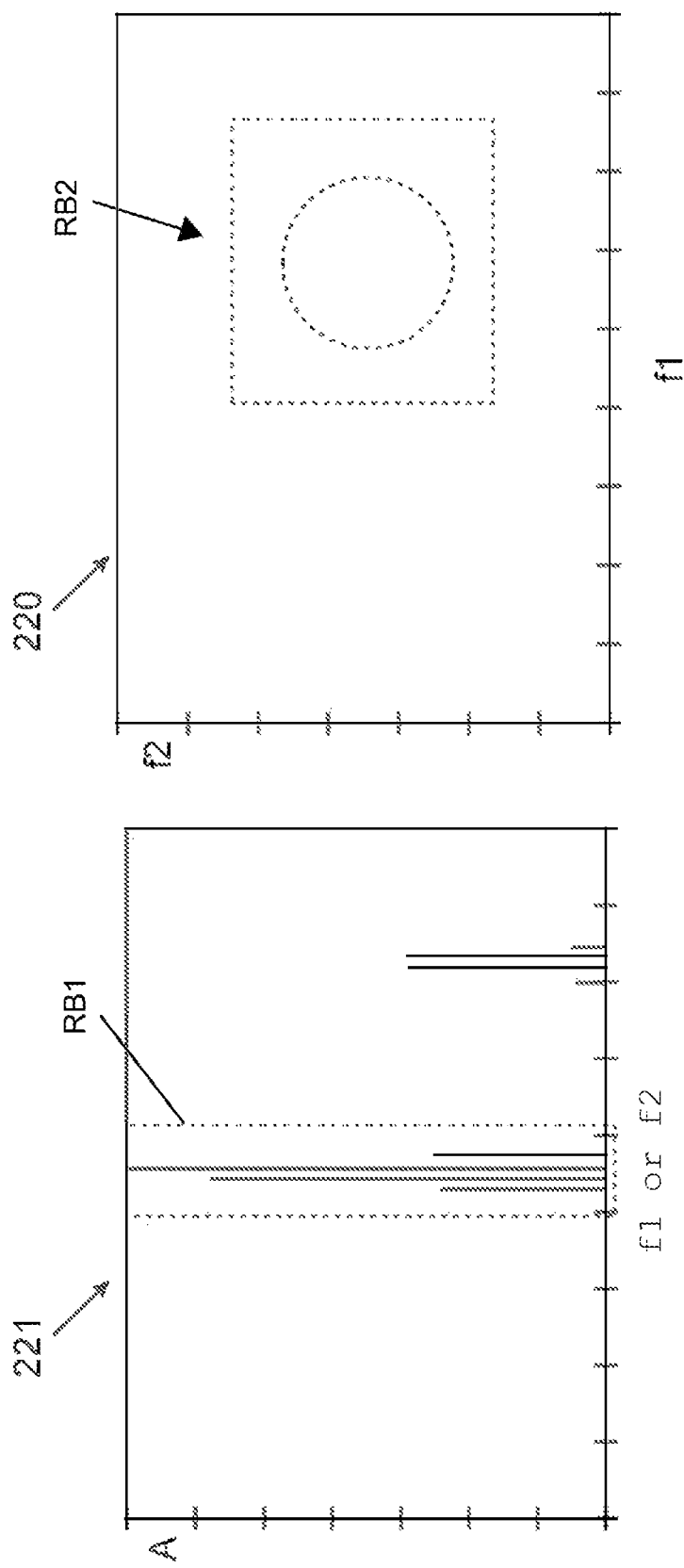
FIG. 6 is a visualization of a relevant frequency band.
Figure 7:
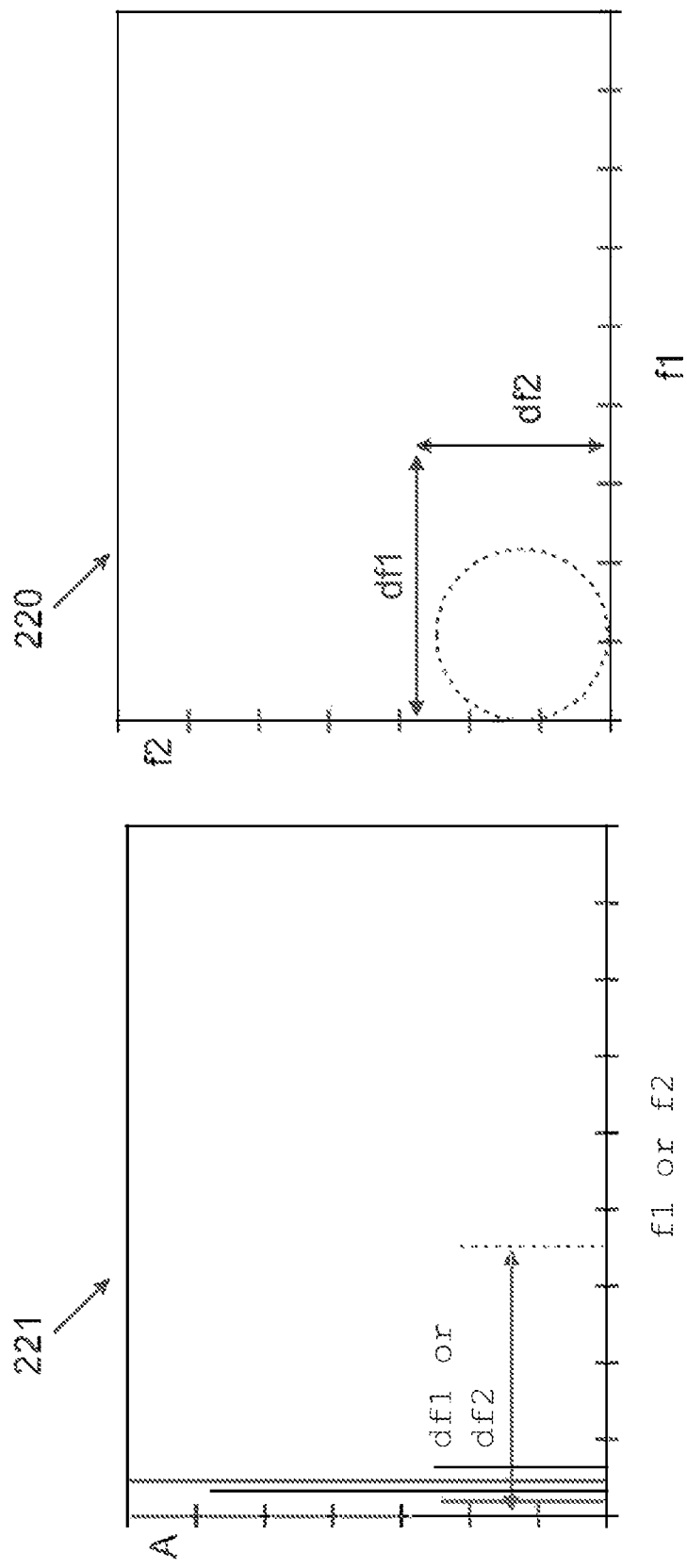
FIG. 7 is a visualization of a shift in the frequency band.

FIG. 6 contains a representation of a relevant frequency band RB1 in the ID spectrum 221 and a relevant frequency band RB2 in the 2D spectrum 220 (with the amplitude A and the frequencies f1 and f2, or in the ID range either f1 or f2). In order to reduce the computing power requirements in the time range, the relevant frequency bands RB1 or RB2 according to FIG. 7 and according to a third step 113 can be shifted into the base band. These frequency shifts are identified with df1 and df2 in the first or second dimension. The signal can subsequently be transformed into the time range e. g by means of inverse Fourier transform).

In a fourth step 114, decoupling of the window function (compensation) can be carried out. FIG. 8 shows an example of how the window function 280 influences the time signal (see window function 280 with the broken line, and time signal with window function 281). This influence can be reversed by the compensation, e.g. by means of division of the known window function thus giving rise to the compensated time signal 282. Furthermore, the time signal can correspond to the processing signal 230.

According to a further advantage with the inventive method 100, the plausibility can be verified of the frequencies in the solutions in accordance with the postprocessing step 130 (as a consequence of the unavoidable noise in the system). One potential criteria is that the frequencies may not exceed the upper and lower limits of the selected frequency bands in FIG. 7.

The previous explanation of the designs only describes this invention using examples. Of course, individual features of these designs can be combined with one another in any way without going beyond the scope of this invention, provided that these features are technologically useful.

LIST OF REFERENCE NUMBERS

1 Radar system
2 Vehicle
10 Radar sensor
20 Transmission antenna
30 Receive antennas
40 Digital-to-analog converter
100 Method
110 Preprocessing step
111 First step
112 Second step
113 Third step
114 Fourth step
115 Fifth step
120 Main processing step
130 Postprocessing step
210 Detection signal
220 Spectrum, 2D spectrum
221 1D spectrum
225 Transformation
230 Processing signal, time signal
240 Target
241A First spike
241B Second spike
241C Third spike
261 Vertical orientation, first dimension (f1)
262 Horizontal orientation, second dimension (f2)
280 Window function
281 Time signal with window function
282 Compensated time signal
290 Processing of receive signal
300 Processing device
310 Analog-digital converter
400 Computer program product
f Frequency
df1 First frequency shift
df2 Second frequency shift
A Amplitude
B Transmission bandwidth

The invention claimed is:

1. A method of operating a vehicle radar system comprising:
compiling a detection signal from a broadcast signal broadcast by the vehicle radar system and reflected signals received by radar sensors of the vehicle radar system such that the detection signal includes a first base frequency corresponding to a distance of one or more target objects from the radar sensors and a second base frequency corresponding to a speed of the one or more target objects relative to the radar sensors;
identifying point targets of the detection signal;
cross correlating the detection signal with a reference spike pattern at the point targets of the detection signal;
selecting potential overlapping ones of the one or more point targets by identifying frequency bands associated with one or more of the point targets for which an output of the cross correlating is below a threshold value as relevant frequency bands;
modifying the detection signal based on the relevant frequency bands;
generating a time domain processing signal from the detection signal as modified based on the relevant frequency bands; and
performing a main processing step on the time domain processing signal by means of parameter estimation such that the two or more of the one or more target objects which overlap are discretely detected.

2. The method in accordance with claim 1, wherein identifying the point targets of the detection signal includes separating useful information from noise in the detection signal.

3. The method in accordance with claim 1, further comprising:
converting the detection signal into a frequency domain signal;
filtering out portions of the frequency domain signal outside of the relevant frequency bands; and
shifting at least one of the relevant frequency bands into a lower frequency range of the frequency domain signal.

4. The method in accordance with claim 1, further comprising:
converting the detection signal into a frequency domain signal;
removing portions of the frequency domain signal outside of the relevant frequency bands from the frequency domain signal; and
transforming the frequency domain signal with the portions removed back into the time domain to generate the time domain processing signal.

5. The method in accordance with claim 1, further comprising:
performing compensation of a window function to generate the time domain processing signal.

6. The method in accordance with claim 1, further comprising:

subsampling for data compression to generate the time domain processing signal.

7. The method in accordance with claim 1, further comprising:

performing a postprocessing step after the main processing step during which a plausibility check of modeling output of the parameter estimation is carried out.

8. The method in accordance with claim 1, wherein the detection signal includes a digitalized model of a two-dimensional spectrum of the detection signal and wherein the spike pattern is a two dimension spike pattern.

9. A non-transitory computer readable recording medium storing thereon a computer program product that can be executed by a processing device to:

compile a detection signal by combining together a broadcast signal broadcast by a vehicle radar system and reflected signals received by radar sensors of the vehicle radar system such that the detection signal includes a first base frequency corresponding to a distance of one or more target objects from the radar sensors and a second base frequency corresponding to a speed of the one or more target objects relative to the radar sensors;

identify point targets of the detection signal;

cross correlate the detection signal with a reference spike pattern at the point targets of the detection signal;

select potential overlapping ones of the one or more point targets by identifying frequency bands associated with ones of the point targets for which an output of the cross corelating is below a threshold value as relevant frequency bands;

modify the detection signal based on the relevant frequency bands;

generate a time domain processing signal from the detection signal as modified based on the relevant frequency bands; and performing a main processing step for target separation, in which modeling on the basis of the at least one provided two-dimensional spectrum is performed by means of parameter estimation in order to detect the targets.

* * * * *